US011217357B2

(12) United States Patent
Yun et al.

(10) Patent No.: US 11,217,357 B2
(45) Date of Patent: Jan. 4, 2022

(54) X-RAY MIRROR OPTICS WITH MULTIPLE HYPERBOLOIDAL/HYPERBOLIC SURFACE PROFILES

(71) Applicant: Sigray, Inc., Concord, CA (US)

(72) Inventors: Wenbing Yun, Walnut Creek, CA (US); Sylvia Jia Yun Lewis, San Francisco, CA (US); Janos Kirz, Berkeley, CA (US)

(73) Assignee: Sigray, Inc., Concord, CA (US)

( * ) Notice: Subject to any disclaimer, the term of this patent is extended or adjusted under 35 U.S.C. 154(b) by 0 days.

(21) Appl. No.: 17/169,159

(22) Filed: Feb. 5, 2021

(65) Prior Publication Data

US 2021/0247334 A1 Aug. 12, 2021

Related U.S. Application Data

(60) Provisional application No. 62/972,236, filed on Feb. 10, 2020.

(51) Int. Cl.
| | |
|---|---|
| *G21K 1/06* | (2006.01) |
| *G01N 23/20008* | (2018.01) |
| *G01N 23/083* | (2018.01) |
| *G01N 23/205* | (2018.01) |

(52) U.S. Cl.
CPC ............ *G21K 1/06* (2013.01); *G01N 23/083* (2013.01); *G01N 23/205* (2013.01); *G01N 23/20008* (2013.01); *G21K 1/062* (2013.01); *G21K 1/067* (2013.01)

(58) Field of Classification Search
CPC ........... G21K 1/06; G21K 1/062; G21K 1/067
USPC ...................................... 378/84, 85
See application file for complete search history.

(56) References Cited

U.S. PATENT DOCUMENTS

| | | | |
|---|---|---|---|
| 4,426,718 A | 1/1984 | Hayashi | |
| 4,562,583 A * | 12/1985 | Hoover | G21K 1/06 378/43 |
| 4,798,446 A | 1/1989 | Hettrick | |
| 4,807,268 A | 2/1989 | Wittrey | |
| 4,940,319 A | 7/1990 | Ueda et al. | |
| 4,951,304 A | 8/1990 | Piestrup et al. | |
| 5,001,737 A | 3/1991 | Lewis et al. | |
| 5,276,724 A | 1/1994 | Kumasaka et al. | |
| 5,452,142 A | 9/1995 | Hall | |

(Continued)

FOREIGN PATENT DOCUMENTS

| | | |
|---|---|---|
| EP | 1169713 | 1/2006 |
| JP | 2003-149392 | 5/2003 |

OTHER PUBLICATIONS

"Curved mirror optics," http://www.x-ray-optics.de/index.php/en/types-of-optics/reflecting-optics/curved-mirrors, (2016).

(Continued)

*Primary Examiner* — Allen C. Ho
(74) *Attorney, Agent, or Firm* — Knobbe, Martens, Olson & Bear, LLP

(57) ABSTRACT

An x-ray mirror optic includes a plurality of surface segments with quadric cross-sections having differing quadric parameters. The quadric cross-sections of the surface segments share a common axis and are configured to reflect x-rays in a plurality of reflections along a single optical axis or in a scattering plane defined as containing an incident x-ray and a corresponding reflected x-ray.

18 Claims, 8 Drawing Sheets

(56) References Cited

U.S. PATENT DOCUMENTS

| | | | |
|---|---|---|---|
| 5,461,657 A | 10/1995 | Hayashida | |
| 5,604,782 A | 2/1997 | Cash, Jr. | |
| 5,682,415 A | 10/1997 | O'Hara | |
| 5,715,291 A | 2/1998 | Momose | |
| 5,768,339 A | 6/1998 | O'Hara | |
| 5,772,903 A | 6/1998 | Hirsch | |
| 5,799,056 A | 8/1998 | Gutman | |
| 5,881,126 A | 3/1999 | Momose | |
| 5,930,325 A | 7/1999 | Momose | |
| 6,108,397 A | 8/2000 | Cash, Jr. | |
| 6,278,764 B1 | 8/2001 | Barbee, Jr. et al. | |
| 6,359,964 B1 | 3/2002 | Kogan | |
| 6,389,100 B1 | 5/2002 | Verman et al. | |
| 6,442,231 B1 | 8/2002 | O'Hara | |
| 6,504,901 B1 | 1/2003 | Loxley et al. | |
| 6,504,902 B2 | 1/2003 | Iwasaki et al. | |
| 6,815,363 B2 | 11/2004 | Yun et al. | |
| 6,829,327 B1 | 12/2004 | Chen | |
| 6,885,503 B2 | 4/2005 | Yun et al. | |
| 6,914,723 B2 | 7/2005 | Yun et al. | |
| 6,917,472 B1 | 7/2005 | Yun et al. | |
| 6,934,359 B2 | 8/2005 | Chen | |
| 6,949,748 B2* | 9/2005 | Ziock | G21K 1/06 250/370.01 |
| 7,057,187 B1 | 6/2006 | Yun et al. | |
| 7,076,026 B2 | 6/2006 | Verman et al. | |
| 7,110,503 B1 | 9/2006 | Kumakhov | |
| 7,119,953 B2 | 10/2006 | Yun et al. | |
| 7,149,283 B2 | 12/2006 | Hoheisel et al. | |
| 7,170,969 B1 | 1/2007 | Yun et al. | |
| 7,183,547 B2 | 2/2007 | Yun et al. | |
| 7,286,640 B2 | 10/2007 | Yun et al. | |
| 7,297,959 B2 | 11/2007 | Yun et al. | |
| 7,365,909 B2 | 4/2008 | Yun et al. | |
| 7,365,918 B1 | 4/2008 | Yun et al. | |
| 7,412,030 B1 | 8/2008 | O'Hara | |
| 7,412,131 B2 | 8/2008 | Lee et al. | |
| 7,414,787 B2 | 8/2008 | Yun et al. | |
| 7,440,542 B2 | 10/2008 | Baumann | |
| 7,453,981 B2 | 11/2008 | Baumann | |
| 7,474,735 B2 | 1/2009 | Spahn | |
| 7,486,770 B2 | 2/2009 | Baumann | |
| 7,492,871 B2 | 2/2009 | Popescu | |
| 7,515,684 B2 | 4/2009 | Gibson et al. | |
| 7,583,789 B1 | 9/2009 | Macdonald et al. | |
| 7,639,786 B2 | 12/2009 | Baumann | |
| 7,738,629 B2 | 6/2010 | Chen | |
| 7,800,072 B2 | 9/2010 | Yun et al. | |
| 7,848,483 B2 | 12/2010 | Platonov | |
| 7,864,426 B2 | 1/2011 | Yun et al. | |
| 7,876,883 B2 | 1/2011 | O'Hara | |
| 7,949,092 B2 | 5/2011 | Brons | |
| 8,165,270 B2 | 4/2012 | David et al. | |
| 8,208,602 B2 | 6/2012 | Lee | |
| 8,233,587 B2 | 7/2012 | Sato | |
| 8,243,879 B2 | 8/2012 | Itoh et al. | |
| 8,249,220 B2 | 8/2012 | Verman et al. | |
| 8,258,485 B2* | 9/2012 | Levesque | H05G 2/003 250/432 R |
| 8,330,131 B2* | 12/2012 | Ceglio | G03F 7/70033 250/504 R |
| 8,344,339 B2* | 1/2013 | Levesque | G03F 7/70166 250/504 R |
| 8,357,894 B2 | 1/2013 | Toth et al. | |
| 8,369,674 B2* | 2/2013 | Lee | G21K 1/062 385/124 |
| 8,390,785 B2* | 3/2013 | Zocchi | G03F 7/70175 355/67 |
| 8,422,633 B2 | 4/2013 | Lantz et al. | |
| 8,451,975 B2 | 5/2013 | Tada | |
| 8,488,743 B2 | 7/2013 | Verman | |
| 8,526,575 B1 | 9/2013 | Yun et al. | |
| 8,565,371 B2 | 10/2013 | Bredno | |
| 8,576,983 B2 | 11/2013 | Baeumer | |
| 8,591,108 B2 | 11/2013 | Tada | |
| 8,686,381 B2* | 4/2014 | Levesque | G03F 7/70175 250/504 R |
| 8,735,844 B1 | 5/2014 | Khaykovich et al. | |
| 8,737,565 B1 | 5/2014 | Lyon et al. | |
| 8,744,048 B2 | 6/2014 | Lee et al. | |
| 8,746,903 B2* | 6/2014 | Bavdaz | G21K 1/06 359/850 |
| 8,824,631 B2 | 9/2014 | Mitsuda et al. | |
| 8,831,175 B2 | 9/2014 | Silver et al. | |
| 9,230,703 B2 | 1/2016 | Mohr et al. | |
| 9,336,917 B2 | 5/2016 | Ozawa et al. | |
| 9,390,881 B2* | 7/2016 | Yun | H01J 35/147 |
| 9,448,190 B2* | 9/2016 | Yun | G01N 23/2076 |
| 9,449,781 B2* | 9/2016 | Yun | G21K 1/06 |
| 9,480,447 B2 | 11/2016 | Mohr et al. | |
| 9,543,109 B2* | 1/2017 | Yun | H01J 35/106 |
| 9,570,265 B1* | 2/2017 | Yun | H01J 35/147 |
| 9,594,036 B2* | 3/2017 | Yun | G21K 1/06 |
| 9,748,012 B2 | 8/2017 | Yokoyama | |
| 9,823,203 B2* | 11/2017 | Yun | G01N 23/205 |
| 9,892,811 B2* | 2/2018 | Motoyama | G02B 5/10 |
| 9,970,119 B2 | 5/2018 | Yokoyama | |
| 10,028,716 B2 | 7/2018 | Rossi | |
| 10,153,061 B2 | 12/2018 | Yokoyama | |
| 10,153,062 B2 | 12/2018 | Gall et al. | |
| 10,182,194 B2 | 1/2019 | Karim et al. | |
| 10,256,001 B2 | 4/2019 | Yokoyama | |
| 10,295,485 B2 | 5/2019 | Yun et al. | |
| 10,295,486 B2 | 5/2019 | Yun et al. | |
| 10,297,359 B2* | 5/2019 | Yun | H01J 35/147 |
| 10,393,683 B2 | 8/2019 | Hegeman et al. | |
| 10,416,099 B2* | 9/2019 | Yun | G21K 1/06 |
| 10,429,325 B2 | 10/2019 | Ito et al. | |
| 10,568,588 B2 | 2/2020 | Koehler et al. | |
| 10,725,381 B2* | 7/2020 | Van Der Post | G02B 17/04 |
| 10,794,845 B2 | 10/2020 | Filsinger | |
| 10,962,491 B2* | 3/2021 | Yun | G21K 1/02 |
| 11,035,806 B2* | 6/2021 | Camus | G21K 1/067 |
| 2002/0080916 A1 | 6/2002 | Jiang | |
| 2003/0054133 A1 | 3/2003 | Wadley et al. | |
| 2003/0112923 A1 | 6/2003 | Lange | |
| 2005/0025281 A1 | 2/2005 | Verman et al. | |
| 2006/0239405 A1 | 10/2006 | Verman | |
| 2007/0189449 A1 | 8/2007 | Baumann | |
| 2008/0094694 A1 | 4/2008 | Yun et al. | |
| 2008/0099935 A1 | 5/2008 | Egle | |
| 2008/0116398 A1 | 5/2008 | Hara | |
| 2008/0117511 A1 | 5/2008 | Chen | |
| 2008/0159707 A1 | 7/2008 | Lee et al. | |
| 2009/0052619 A1 | 2/2009 | Endoh | |
| 2010/0012845 A1 | 1/2010 | Baeumer et al. | |
| 2010/0046702 A1 | 2/2010 | Chen et al. | |
| 2010/0091947 A1 | 4/2010 | Niu | |
| 2010/0096557 A1 | 4/2010 | Zocchi et al. | |
| 2010/0260315 A1 | 10/2010 | Sato et al. | |
| 2010/0272239 A1 | 10/2010 | Lantz et al. | |
| 2011/0064191 A1 | 3/2011 | Toth et al. | |
| 2011/0085644 A1 | 4/2011 | Verman | |
| 2012/0163547 A1 | 6/2012 | Lee et al. | |
| 2012/0163554 A1 | 6/2012 | Tada | |
| 2012/0224670 A1 | 9/2012 | Kiyohara et al. | |
| 2013/0108022 A1 | 5/2013 | Kugland et al. | |
| 2013/0279651 A1 | 10/2013 | Yokoyama | |
| 2013/0308112 A1 | 11/2013 | Clube et al. | |
| 2014/0105363 A1 | 4/2014 | Chen et al. | |
| 2014/0241493 A1 | 8/2014 | Yokoyama | |
| 2015/0055745 A1 | 2/2015 | Holzner et al. | |
| 2015/0194287 A1 | 7/2015 | Yun et al. | |
| 2016/0178540 A1 | 6/2016 | Yun et al. | |
| 2017/0052128 A1 | 2/2017 | Yun et al. | |
| 2017/0074809 A1 | 3/2017 | Ito | |
| 2019/0043689 A1 | 2/2019 | Camus | |
| 2019/0064084 A1 | 2/2019 | Ullom et al. | |
| 2019/0154892 A1 | 5/2019 | Moldovan | |
| 2019/0204246 A1 | 7/2019 | Hegeman et al. | |
| 2019/0204757 A1 | 7/2019 | Brussard et al. | |
| 2019/0216416 A1 | 7/2019 | Koehler et al. | |
| 2019/0219713 A1 | 7/2019 | Booker et al. | |

(56) References Cited

U.S. PATENT DOCUMENTS

| | | |
|---|---|---|
| 2019/0272929 A1 | 9/2019 | Omote et al. |
| 2019/0353802 A1 | 11/2019 | Steinhauser et al. |
| 2020/0292475 A1 | 9/2020 | Cao et al. |
| 2020/0297297 A1 | 9/2020 | Kok et al. |
| 2020/0398509 A1 | 12/2020 | Sanli et al. |

OTHER PUBLICATIONS

Esashi et al., "Influence of surface and interface roughness on X-ray and extreme ultraviolet reflectance: A comparative numerical study," OSA Continuum, vol. 4, No. 5, pp. 1497-1518 (2021).

Riveros et al., "Fabrication of single crystal silicon mirror substrates for X-ray astronomical missions," Proc. vol. 9144, Space Telescopes and Instrumentation 2014: Ultraviolet to Gamma Ray, p. 91445 (1-6) (2014).

Zhang et al., "Simulation of optical properties of ellipsoidal monocapillary X-ray optics with inner-surface imperfections," Optical Comm. https:doi.org/10-1016/j.optcom.2021.127028 (2021).

International Search Report and Written Opinion for PCT/US2021/016788, dated May 7, 2021 (9 pages).

"Monochromatic Doubly Curved Crystal Optics," published by: X-Ray Optical Systems, Inc. (XOS), East Greenbush, NY; 2017.

"Optics and Detectors," Section 4 of X-Ray Data Booklet, 3rd Ed., A.C. Thompson ed. (Lawrence Berkeley Nat'l Lab, Berkeley, CA, 2009).

"Series 5000 Packaged X-ray Tubes," Product Technical Data Sheet DS006 Rev. G, X-Ray Technologies Inc. (Oxford Instruments), Scotts Valley, CA (no date).

"X-ray Optics for BES Light Source Facilities," Report of the Basic Energy Sciences Workshop on X-ray Optics for BES Light Source Facilities, D. Mills & H. Padmore, Co-Chairs, (U.S. Dept. of Energy, Office of Science, Potomac, MD, Mar. 2013).

Abullian et al., "Quantitative determination of the lateral density and intermolecular correlation between proteins anchored on the membrane surfaces using grazing incidence small-angle X-ray scattering and grazing incidence X-ray fluorescence," Nov. 28, 2012, The Journal of Chemical Physics, vol. 137, p. 204907-1 to 204907-8.

Aharonovich et al., "Diamond Nanophotonics," Adv. Op. Mat'ls vol. 2, Issue 10 (2014).

Akan et al., "Metal-Assisted Chemical Etching and Electroless Deposition for Fabrication of Hard X-ray Pd/Si Zone Plates," Micromachines, vol. 11, 301; doi: 10.3390/mi11030301 (2020).

Arndt et al., Focusing Mirrors for Use with Microfocus X-ray Tubes, 1998, Journal of Applied Crystallography, vol. 31, pp. 733-741.

Balaic et al., "X-ray optics of tapered capillaries," Appl. Opt. vol. 34 (Nov. 1995) pp. 7263-7272.

Baltes et al., "Coherent and incoherent grating reconstruction," J. Opt. Soc. Am. A vol. 3(8), (1986), pp. 1268-1275.

Barbee Jr., "Multilayers for x-ray optics," Opt. Eng. vol. 25 (Aug. 1986) pp. 898-915.

Bergamin et al., "Measuring small lattice distortions in Si-crystals by phase-contrast x-ray topography," J. Phys. D: Appl. Phys. vol. 33 (Dec. 31, 2000) pp. 2678-2682.

Bilderback et al., "Single Capillaries," Ch. 29 of "Handbook of Optics vol. III, 2nd Ed." (McGraw Hill, New York, 2001).

Bjeoumikhov et al., "A modular system for XRF and XRD applications consisting of a microfocus X-ray source and different capillary optics," X-Ray Spectrometry, vol. 33 (2004), pp. 312-316.

Bjeoumikhov et al., "Capillary Optics for X-Rays," Ch. 18 of "Modern Developments in X-Ray and Neutron Optics," A. Erko et al., eds. (Springer, Berlin, Germany, 2008), pp. 287-306.

Cerrina, "The Schwarzschild Objective," Ch. 27 of "Handbook of Optics vol. III, 2nd Ed." (McGraw Hill, New York, 2001).

Chang et al., "Ultra-high aspect ratio high-resolution nanofabrication of hard X-ray diffractive optics," Nature Comm. 5:4243, doi: 10.1038/ncomms5243 (2014).

Chen et al., "Guiding and focusing neutron beams using capillary optics," Nature vol. 357 (Jun. 4, 1992), pp. 391-393.

Chen et al., "Doubly curved crystal (DCC) X-ray optics and applications," Powder Diffraction, vol. 17(2) (2002), pp. 99-103.

Chon, "Measurement of Roundness for an X-Ray Mono-Capillary Optic by Using Computed Tomography," J. Korean Phys. Soc. vol. 74, No. 9, pp. 901-906 (May 2019).

Cornaby et al., "Advances in X-ray Microfocusing with Monocapillary Optics at CHESS," CHESS News Magazine (2009), pp. 63-66.

Cornaby et al., "Design of Single-Bounce Monocapillary X-ray Optics," Advances in X-ray Analysis: Proceedings of the 55th Annual Conference on Applications of X-ray Analysis, vol. 50, (International Centre for Diffraction Data (ICDD), 2007), pp. 194-200.

Cornaby, "The Handbook of X-ray Single Bounce Monocapillary Optics, Including Optical Design and Synchrotron Applications" (PhD Dissertation, Cornell University, Ithaca, NY, May 2008).

Datta et al., "A new generation of direct X-ray detectors for medical and synchrotron imaging applications," Sci. Reports, vol. 10, p. 20097 (2020).

David et al., "Fabrication of diffraction gratings for hard x-ray phase contrast imaging," Microelectron. Eng. vol. 84, (2007), pp. 1172-1177.

Erko et al., "X-ray Optics," Ch. 3 of "Handbook of Practical X-Ray Fluorescence Analysis," B. Beckhoff et al., eds. (Springer, Berlin, Germany, 2006), pp. 85-198.

Freund, "Mirrors for Synchrotron Beamlines," Ch. 26 of "Handbook of Optics vol. III, 2nd Ed." (McGraw Hill, New York, 2001).

Gibson et al., "Polycapillary Optics: An Enabling Technology for New Applications," Advances in X-ray Analysis, vol. 45 (2002), pp. 286-297.

Guttmann et al., "Ellipsoidal capillary as condenser for the BESSY full-field x-ray microscope," J. Phys. Conf. Ser. vol. 186 (2009): 012064.

Hasse et al., "New developments in laboratory-based x-ray sources and optics," Adv. In Laboratory-based X-Ray Sources, Optics, and Applications VI, ed. A.M. Khounsary, Proc. SPIE vol. 10387, 103870B-1 (2017).

Howells, "Mirrors for Synchrotron-Radiation Beamlines," Publication LBL-34750 (Lawrence Berkeley Laboratory, Berkeley, CA, Sep. 1993).

Howells, "Gratings and Monochromators in the VUV and Soft X-RAY Spectral Region," Ch. 21 of Handbook of Optics vol. III, 2nd Ed. (McGraw Hill, New York, 2001).

Hrdý et al., "Diffractive-Refractive Optics: X-ray Crystal Monochromators with Profiled Diffracting Surfaces," Ch. 20 of "Modern Developments in X-Ray and Neutron Optics," A. Erko et al., eds. (Springer, Berlin Heidelberg New York, 2008).

Huang et al., "Theoretical analysis and optimization of highly efficient multilayer-coated blazed gratings with high fix-focus constant for the tender X-ray region," Op. Express Vo. 28, No. 2, pp. 821-845 (2020).

Jahrman et al., "Vacuum formed temporary spherically and toroidally bent crystal analyzers for x-ray absorption and x-ray emission spectroscopy," Rev. Sci. Inst. vol. 90, 013106 (2019).

Joy, "Astronomical X-ray Optics," Ch. 28 of "Handbook of Optics vol. III, 2nd Ed.," (McGraw Hill, New York, 2001).

Kirz, "Phase zone plates for x-rays and the extreme uv," J. Op. Soc. Am. vol. 64 (Mar. 1974), pp. 301-309.

Kumakhov et al., "Multiple reflection from surface X-ray optics," Physics Reports, vol. 191(5), (1990), pp. 289-350.

Kumakhov, "X-ray Capillary Optics. History of Development and Present Status" in Kumakhov Optics and Application, Proc. SPIE 4155 (2000), pp. 2-12.

Kuznetsov, "X-Ray Optics Calculator," Institute of Microelectronics Technology and High Purity Materials, Russian Academy of Sciences (IMT RAS), Chernogolovka, Russia (6 pages submitted); 2016.

Lagomarsino et al., "Reflective Optical Arrays," Ch. 19 of "Modern Developments in X-Ray and Neutron Optics," A. Erko et al. eds. (Springer, Berlin, Germany, 2008), pp. 307-317.

Lai, "X-Ray Microfocusing Optics," Slide Presentation from Argonne National Laboratory, 71 slides, Cheiron Summer School 2007.

(56) References Cited

OTHER PUBLICATIONS

Lechner et al., "Silicon drift detectors for high count rate X-ray spectroscopy at room temperature," Nuclear Instruments and Methods, vol. 458A (2001), pp. 281-287.
Lengeler et al., "Refractive X-ray Optics," Ch. 20 of "Handbook of Optics vol. III, 2nd Ed." (McGraw Hill, New York, 2001).
Lübcke et al., "Soft X-ray nanoscale imaging using a sub-pixel resolution charge coupled device (CCD) camera," Rev. Sci. Instrum. vol. 90, 043111 (2019).
MacDonald et al., "Polycapillary X-ray Optics for Microdiffraction," J. Appl. Cryst., vol. 32 (1999) pp. 160-167.
MacDonald et al., "Polycapillary and Multichannel Plate X-Ray Optics," Ch. 30 of "Handbook of Optics vol. III, 2nd Ed.," (McGraw Hill, New York, 2001).
MacDonald et al., "An Introduction to X-ray and Neutron Optics," Ch. 19 of "Handbook of Optics vol. III, 2nd Ed." (McGraw Hill, New York, 2001).
MacDonald, "Focusing Polycapillary Optics and Their Applications," X-Ray Optics and Instrumentation, vol. 2010, (Oct. 2010): 867049.
Maj et al., "Etching methods for improving surface imperfections of diamonds used for x-ray monochromators," Adv. X-ray Anal., vol. 48 (2005), pp. 176-182.
Malgrange, "X-ray Optics for Synchrotron Radiation," ACTA Physica Polonica A, vol. 82(1) (1992) pp. 13-32.
Matsushita, "Mirrors and Multilayers," Slide Presentation from Photon Factor, Tsukuba, Japan, 65 slides, (Cheiron School 2009, Sprint-8, Japan, Nov. 2009).
Matsushita, "X-ray monochromators," Slide Presentation from Photon Factory, Tsukuba, Japan, 70 slides, (Cheiron School 2009, Spring-8, Japan, Nov. 2009).
Michette, "Zone and Phase Plates, Bragg-Fresnel Optics," Ch. 23 of "Handbook of Optics vol. III, 2nd Ed.," (McGraw Hill, New York, 2001).
Montgomery, "Self Imaging Objects of Infinite Aperture," J. Opt. Soc. Am. vol. 57(6), (1967), pp. 772-778.
Noda et al., "Fabrication of Diffraction Grating with High Aspect Ratio Using X-ray Lithography Technique for X-ray Phase Imaging," Jpn. J. Appl. Phys. vol. 46, (2007), pp. 849-851.
Noda et al., "Fabrication of High Aspect Ratio X-ray Grating Using X-ray Lithography" J. Solid Mech_ Mater. Eng. vol. 3 (2009), pp. 416-423.
PAXSCAN Flat Panel X-ray Imaging, Varian Sales Brochure, (Varian Medical Systems, Palo Alto, CA, Nov. 11, 2004).
Romano et al., "Microfabrication of X-ray Optics by Metal Assisted Chemical Etching: A Review," Micromachines, vol. 11, No. 589, 23 pages (2020).
Scholze et al., "X-ray Detectors and XRF Detection Channels," Ch. 4 of "Handbook of Practical X-Ray Fluorescence Analysis," B. Beckhoff et al., eds. (Springer, Berlin Heidelberg, Germany, 2006), pp. 85-198.
Scordo et al., "Pyrolytic Graphite Mosaic Crystal Thickness and Mosaicity Optimization for an Extended Source Von Hamos X-ray Spectrometer," Condens. Matter Vo. 4, pp. 38-52 (2019).
Scott, "Hybrid Semiconductor Detectors for High Spatial Resolution Phase-contrast X-ray Imaging," Thesis, University of Waterloo, Department of Electrical and Computer Engineering, 2019.
Sebert, "Flat-panel detectors:how much better are they?" Pediatr. Radiol, vol. 36 (Suppl 2), (2006), pp. 173-181.
Senba et al., "Stable sub-micrometre high-flux probe for soft X-ray ARPES using a monolithic Wolter mirror," J. Synch. Rad., vol. 27, 5 pages, (2020).
Shen, "Polarizing Crystal Optics," Ch. 25 of "Handbook of Optics vol. III, 2nd Ed." (McGraw Hill, New York, 2001).
Shi et al., "Towards the Fabrication of High-Aspect-Ratio Silicon Gratings by Deep Reactive Ion Etching," Micromachines, vol. 11, p. 864, 13 pages (2020).
Shields et al., "Overview of Polycapillary X-ray Optics," Powder Diffraction, vol. 17(2) (Jun. 2002), pp. 70-80.
Siddons, "Crystal Monochromators and Bent Crystals," Ch. 22 of "Handbook of Optics vol. III, 2nd Ed.," (McGraw Hill, New York, 2001).
Snigirev et al., "Hard X-Ray Microoptics," Ch. 17 of "Modern Developments in X-Ray and Neutron Optics," A. Erko et al., eds (Springer, Berlin, Germany, 2008), pp. 255-285.
Spiller, "Multilayers," Ch. 24 of "Handbook of Optics vol. III, 2nd Ed.," (McGraw Hill, New York, 2001).
Strüder et al., "X-Ray Detectors," Ch. 4 of "X-ray Spectrometry: Recent Technological Advances," K. Tsuji et al. eds. (John Wiley & Sons, Ltd. Chichester, West Sussex, UK, 2004), pp. 63-131.
Strüder et al., "Silicon Drift Detectors for X-ray Imaging," Presentation at Detector Workshop on Synchrotron Radiation Instrumentation, 54 slides, (Argonne Nat'l Lab, Argonne, IL Dec. 8, 2005), available at: http://www.aps.anl.gov/News/Conferences/2005/Synchrotron_Radiation_Instrumentation/Presentations/Strueder.pdf.
Sun et al., "Numerical design of in-line X-ray phase-contrast imaging based on ellipsoidal singlebounce monocapillary," Nucl. Inst. And Methods in Phys. Res. A746 (2014) pp. 33-38.
Sun et al., "Combined optic system based on polycapillary X-ray optics and single-bounce monocapillary optics for focusing X-rays from a conventional laboratory X-ray source," Nucl. Inst. and Methods in Phys. Res. A 802 (2015) pp. 5-9.
Suzuki, "Development of the DIGITEX Satire Cardiac System Equipped with Direct conversion Flat Panel Detector," Digital Anglo Technical Report (Shimadzu Corp., Kyoto, Japan, no date, published—2004 with product release).
Suzuki et al., "Hard X-ray Imaging Microscopy using X-ray Guide Tube as Beam Condenser for Field Illumination," J. Phys.: Conf. Ser. vol. 463 (2013): 012028.
Takahama, "RADspeed satire Digital General Radiography System Equipped with New Direct-Conversion FPD," Medical Now, No. 62 (2007).
Takeo et al., "Soft x-ray nanobeam formed by an ellipsoidal mirror," Appl. Phys. Lett., vol. 116, 121102 (2020).
Takeo et al., "A highly efficient nanofocusing system for soft x rays," Appl. Phys. Lett., vol. 117, 151104 (2020).
Wang, On the single-photon-counting (SPC) modes of imaging using an XFEL source, presented at IWORLD 2015.
Wang et al., "Measuring the average slope error of a single-bounce ellipsoidal glass monocapillary X-ray condenser based on an X-ray source with an adjustable source size," Nucl. Inst. and Meth. A934, 36-40 (2019).
Wang et al., "Double-spherically bent crystal high-resolution X-ray spectroscopy of spatially extended sources," Chinese Optics Lett., vol. 18(6), 061101 (2020).
Wang et al., "Design and Fabrication of Soft X ray Supermirrors," https://doi.org/10.21203/rs.3.rs-139888/v1 (2021).
Wobrauschek et al., "Micro XRF of light elements using a polycapillary lens and an ultra-thin window Silicon Drift Detector inside a vacuum chamber," 2005, International Centre for Diffraction Data 2005, Advances in X-ray Analysis, vol. 48, pp. 229-235.
Wolter, "Spiegelsysteme streifenden Einfalls als abbildende Optiken fur Rontgenstrahlen" [Grazing Incidence Reflector Systems as Imaging Optics for X-rays] Annalen der Physik vol. 445, Issue 1-2 (1952), pp. 94-114.
X-ray-Optics.de Website, http://www.x-ray-optics.de/, accessed Feb. 13, 2016.
Yakimchuk et al., "Ellipsoidal Concentrators for Laboratory X-ray Sources: Analytical approaches for optimization," Mar. 22, 2013, Crystallography Reports, vol. 58, No. 2, pp. 355-364.
Yanagihara et al., "X-Ray Optics," Ch. 3 of "X-ray Spectrometry: Recent Technological Advances," K. Tsuji et al. eds. (John Wiley & Sons, Ltd. Chichester, West Sussex, UK, 2004), pp. 63-131.
Yang et al., "Comparative study of single-layer, bilayer, and trilayer mirrors with enhanced x-ray reflectance in 0.5- to 80keV energy region," J. Astron. Telesc. Instrum. Syst., vol. 6(4) 044001, 12 pages (2020).
Yashiro et al., "Optimal Design of Transmission Grating for X-ray Talbot Interferometer", Advances in X-ray Analysis vol. 49(3) (2006), pp. 375-379.

(56) References Cited

OTHER PUBLICATIONS

Yashiro et al., "Hard-X-Ray Phase-Difference Microscopy Using a Fresnel Zone Plate and a Transmission Grating", Phys. Rev. Lett. vol. 103 (2009), 180801.

Zeng et al., "Ellipsoidal and parabolic glass capillaries as condensers for x-ray microscopes," Appl. Opt. vol. 47 (May 2008), pp. 2376-2381.

Zeng et al., "Glass Monocapillary X-ray Optics and Their Applications in X-Ray Microscopy," X-ray Optics and Microanalysis: Proceedings of the 20th International Congress, AIP Conf. Proc. vol. 1221, (2010).

Zhang et al., "Application of confocal X-ray fluorescence based on capillary X-ray optics in nondestructively measuring the inner diameter of monocapillary optics," Optics Comm. (2018) https://doi.org/10.1016/j.optcom.2018.11.064.010), pp. 41-47.

Zhang et al., "Measurement of the inner diameter of monocapillary with confocal X-ray scattering technology based on capillary X-ray optics," Appl. Opt. (Jan. 8, 2019), doc ID 351489, pp. 1-10.

Zhou et al., "Quasi-parallel X-ray microbeam obtained using a parabolic monocapillary X-ray lens with an embedded square-shaped lead occluder," arXiv:2001.04667 (2020).

Shao et al., "A passive characterization method of the single-bounce ellipsoidal capillary for the full field transmission X-ray microscopy," Nucl. Inst. and Meth. In Phys. Res. A, doi:https://doi.org/10.1016/j.nima.2021.165735 (2021).

Titus et al., "Advancing the in-situ characterization of light elements via X-ray absorption spectroscopy using superconducting detectors," Microsc. Microanal., vol. 27, (Suppl. 1), p. 2890 (2021).

Wang et al., "Improvements in Micro-CT Method for Characterizing X-ray Monocapillary Optics," arXiv.2106.15410 (2021).

Zuo et al., "Precision polishing of the mandrel for X-ray grazing incidence mirrors," Int'l J. of Adv. Manuf. Tech., https://doi.org/10.1007/s00170-021-07185-1 (2021).

\* cited by examiner

FIG. 3A:

Hyperboloid:

$$\frac{x^2}{a^2} - \frac{y^2}{b^2} = 1 \qquad b^2 = c^2 - a^2$$

$$y = \frac{b}{a}\sqrt{x^2 - a^2}$$

$$\frac{dy}{dx} = \tan\beta = \frac{b}{a} \cdot \frac{x}{\sqrt{x^2 - a^2}}$$

Slope of $d_1$: $\tan\varphi = \frac{y}{x-c} = \frac{b\sqrt{x^2-a^2}}{a(x-c)}$

Grazing angle: $\theta = \varphi - \beta$ $$\tan\theta = \tan(\varphi - \beta) = \frac{\tan\varphi - \tan\beta}{1 + \tan\varphi \tan\beta}$$

$$\tan\theta = \frac{b\left(\frac{\sqrt{x^2 - a^2}}{x - c} - \frac{x}{\sqrt{x^2 - a^2}}\right)}{a\left[1 + \frac{b^2}{a^2} \cdot \frac{x}{(x-c)}\right]}$$

If $x \gg a$, $\sqrt{x^2 - a^2} \approx x\left(1 - \frac{a^2}{2x^2}\right) \sim x$ $$\theta \sim \frac{b}{a} \cdot \frac{\left(\frac{x}{x-c} - 1\right)}{1 + \frac{b^2}{a^2} \cdot \frac{x}{(x-c)}} = \frac{bc}{a\left(x\left(1 + \frac{b^2}{a^2}\right) - c\right)}$$

FIG. 6A:
FIG. 6B:
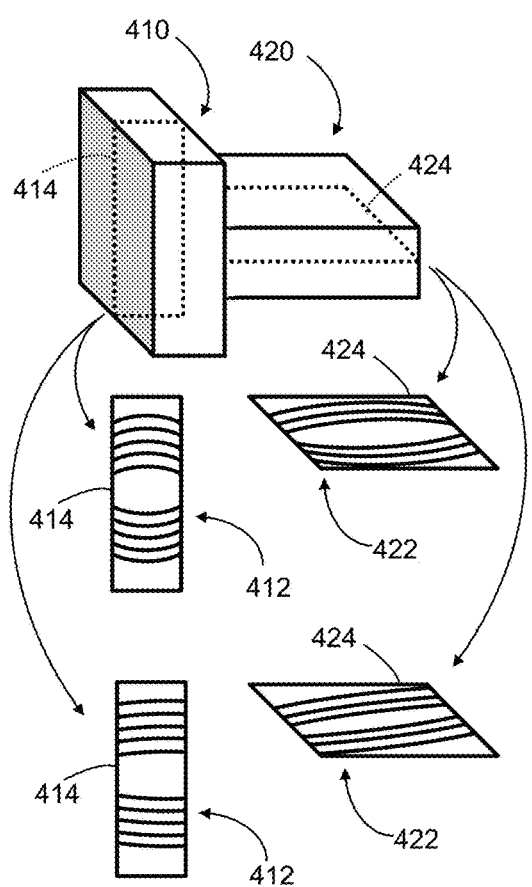
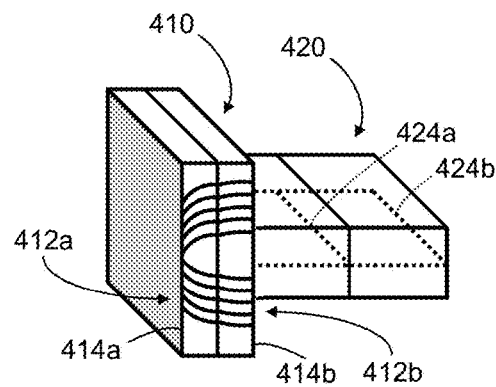

X-RAY MIRROR OPTICS WITH MULTIPLE HYPERBOLOIDAL/HYPERBOLIC SURFACE PROFILES

CLAIM OF PRIORITY

This application claims the benefit of priority to U.S. Provisional Appl. No. 62/972,236 filed on Feb. 10, 2020 and incorporated in its entirety by reference herein.

BACKGROUND

Field

The present application relates generally to x-ray mirror optics.

Description of the Related Art

Conventional x-ray sources generate x-ray beams that originate and diverge from in a target region that is bombarded by energetic electron beams. In some applications, the x-rays from the x-ray source are collected and directed (e.g., in an extended, focused x-ray beam or in a collimated x-ray beam) to irradiate a sample for analysis, sometimes with additional x-ray optical components, such as a crystal or multilayer monochromator. The x-rays can be directed to irradiate a sample (e.g., the whole sample or a small portion of the sample) to perform one or more forms of x-ray analysis (e.g., imaging; crystallography; absorption spectroscopy; emission spectroscopy; elemental or chemical analysis).

In some other applications, x-rays (e.g., fluorescence x-rays, elastically or inelastically scattered x-rays) resulting from irradiation of ionizing radiation (e.g., x-rays, energetic electrons, or ions) in a sample are collected and directed to a detector for analysis.

Various forms of x-ray optic elements/systems are used to collect and condition (e.g., focus; collimate) the x-rays. Grazing incidence x-ray mirrors are achromatic and can provide an advantage over diffractive and refractive optics for many applications. Generally, the grazing incidence angles for desired reflectivities are equal to or less than the critical angle. For each reflection, the angle between the reflected x-ray and the incident x-ray is equal to two times the incidence angle, as measured from the tangent to the surface.

SUMMARY

In certain implementations, an x-ray mirror optic comprises a plurality of surface segments with quadric cross-sections having differing quadric parameters. The quadric cross-sections of the surface segments share a common axis and are configured to reflect x-rays in a plurality of reflections along a single optical axis or in a scattering plane defined as containing an incident x-ray and a corresponding reflected x-ray.

In certain implementations, an x-ray mirror optic comprises a first plurality of non-axially symmetric mirror sections and a second plurality of non-axially symmetric mirror sections. The first plurality of non-axially symmetric mirror sections and/or the second plurality of non-axially symmetric mirror sections comprises pairs of mirror sections, each pair comprising two mirror sections that have substantially the same quadric surface shape and quadric surface parameters as one another and are on opposite sides of an optical axis of the x-ray optic.

In certain implementations, a method of fabricating an x-ray mirror optic is provided. The x-ray mirror optic comprises a first plurality of non-axially symmetric mirror sections and a second plurality of non-axially symmetric mirror sections. The first plurality of non-axially symmetric mirror sections and/or the second plurality of non-axially symmetric mirror sections comprises pairs of mirror sections, each pair comprising two mirror sections that have substantially the same quadric surface shape and quadric surface parameters as one another and are on opposite sides of an optical axis of the x-ray optic. The method comprises etching the first plurality of non-axially symmetric mirror sections and/or the second plurality of non-axially symmetric mirror sections into a substrate.

In certain implementations, an x-ray mirror optic system comprises a first substrate comprising a first plurality of reflective surfaces that are curved in a first cross-sectional plane and that are substantially not curved along a direction substantially perpendicular to the first cross-sectional plane. The x-ray mirror optic system further comprises a second substrate comprising a second plurality of reflective surfaces that are curved in a second cross-sectional plane and that are substantially not curved along a direction substantially perpendicular to the second cross-sectional plane. The second substrate is positioned relative to the first substrate such that the second cross-sectional plane is substantially perpendicular to the first cross-sectional plane.

In certain implementations, an x-ray mirror optic system comprises a pair of first substrates, one substrate of the pair of first substrates comprising a first plurality of reflective surfaces that are curved in a first cross-sectional plane and that are substantially not curved along a direction substantially perpendicular to the first cross-sectional plane. The other substrate of the pair of first substrates comprises a second plurality of reflective surfaces that are curved in a second cross-sectional plane and that are substantially not curved along a direction substantially perpendicular to the second cross-sectional plane. The x-ray mirror optic system further comprises a pair of second substrates, one substrate of the pair of second substrates comprising a third plurality of reflective surfaces that are curved in a third cross-sectional plane and that are substantially not curved along a direction substantially perpendicular to the third cross-sectional plane. The other substrate of the pair of second substrates comprises a fourth plurality of reflective surfaces that are curved in a fourth cross-sectional plane and that are substantially not curved along a direction substantially perpendicular to the fourth cross-sectional plane. The pair of first substrates are positioned such that the second cross-sectional plane is substantially parallel to the first cross-sectional plane, and the pair of second substrates are positioned such that the fourth cross-sectional plane is substantially parallel to the third cross-sectional plane, and the third cross-sectional plane is substantially perpendicular to the first cross-sectional plane.

BRIEF DESCRIPTION OF THE DRAWINGS

FIG. 3A includes various equations relevant to a hyperbolic surface portion (e.g., in 2D) and a hyperboloidal surface portion (e.g., in 3D) in accordance with certain implementations described herein.

FIG. 6A schematically illustrates first and second substrates in accordance with certain implementations described herein.

FIG. 6B schematically illustrates a pair of first substrates and a pair of second substrates in accordance with certain implementations described herein.

DETAILED DESCRIPTION

Overview

X-ray mirrors can be used to focus or collimate x-rays from an x-ray source or from a sample irradiated by ionizing radiation (e.g., x-rays; electrons; ions), and to produce an image of an object irradiated by an x-ray beam (e.g., in an x-ray microscope). Conventional x-ray mirror optics are limited in numerical aperture, optical aperture, and/or focal length, and these limitations can be problematic for various applications. Examples of conventional x-ray mirror optics to be used with an x-ray source (e.g., a primary x-ray source or a secondary x-ray source) include x-ray mirror lenses having a Wolter-type x-ray optic configuration. A Wolter-type x-ray optic configuration is a compound optic configuration comprising two mirrors of different reflecting surface profiles, and such configurations have been used previously for x-ray telescopes. There are several different types of Wolter x-ray optics that have been specifically designed for x-ray astronomy (e.g., the Wolter x-ray optics focus an extended parallel incident x-ray beam), and examples include:

Type I: Comprising an ellipsoidal mirror section and a hyperboloidal mirror section with x-rays reflected in the same direction (e.g., for demagnifying use);

Type II: Comprising a hyperboloidal mirror section and an ellipsoidal mirror section, with x-rays reflected in opposite directions; and Type III: Comprising an ellipsoidal mirror section and a paraboloidal mirror section, with x-rays reflected in opposite directions.

Figure 1:
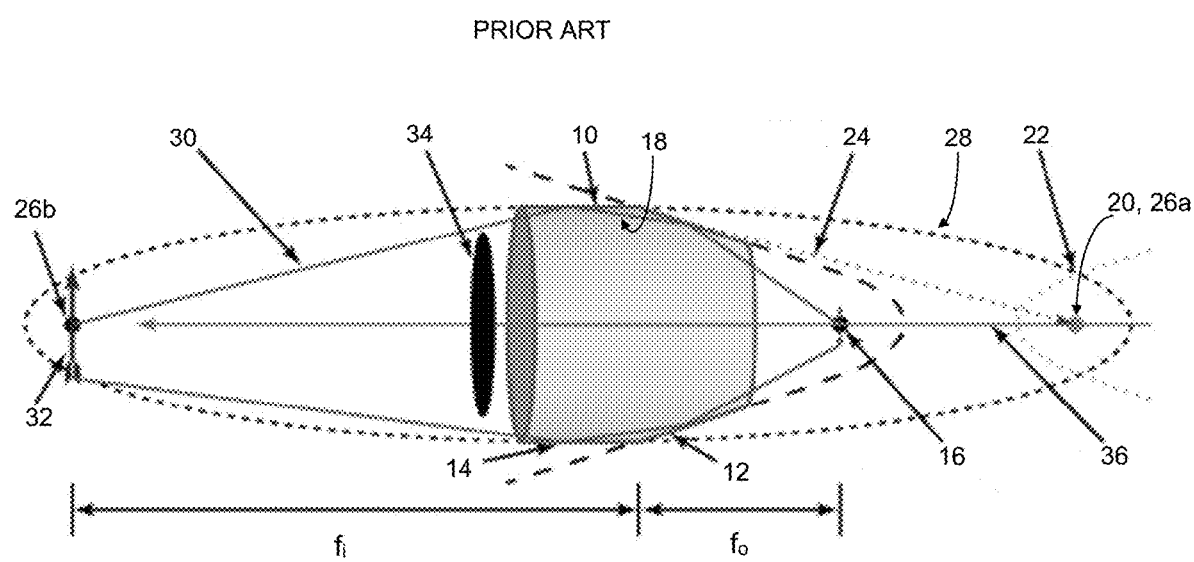
FIG. 1 schematically illustrates an axially symmetric Wolter Type I optic configured for two-dimensional (2D) imaging and comprising a confocal hyperboloidal mirror section followed by an ellipsoidal mirror section.

FIG. 1 schematically illustrates an axially symmetric Wolter Type I optic 10 configured for two-dimensional (2D) imaging and comprising a confocal hyperboloidal mirror section 12 followed by (e.g., upstream from) an ellipsoidal mirror section 14. At least some of the radiation (e.g., neutrons; x-rays) emitted from a source positioned substantially at a focus 16 of the hyperboloidal mirror section 12 is reflected by the hyperboloidal mirror section 12 and is subsequently reflected by the ellipsoidal mirror section 14. The radiation 18 reflected from the hyperboloidal mirror section 12 appears to come from a conjugate focus 20 of a virtual hyperbola 22 corresponding to the hyperboloidal mirror section 12 (denoted in FIG. 1 by dotted line 24). When this conjugate focus 20 of the virtual hyperbola 22 is substantially coincident with one of the two foci 26a of the ellipsoid 28 corresponding to the ellipsoidal mirror section 14, the radiation 30 reflected from the hyperboloidal mirror section 12 and subsequently from the ellipsoidal mirror section 14 produces a real, magnified image 32 of the object, the magnified image 32 at the other of the two foci 26b of the ellipsoid 28 (e.g., where a radiation detector can be positioned). The magnified image 32 can have a magnification M equal to the ratio of the distance $f_i$ between the Wolter optic 10 and the image 32 and the distance $f_o$ between the Wolter optic 10 and the focus 16 (e.g., M=10). Other configurations in which the positions of the object and the image are switched with one another (e.g., resulting in a demagnification of the object) are also possible. In addition, other configurations which utilize a confocal hyperbolic mirror section followed by (e.g., upstream from) an elliptic mirror section can be used for one-dimensional (1D) imaging. In addition to the Wolter optic 10, an aperture stop 34 can be configured (e.g., positioned along the optical axis 36 of the Wolter optic 10) to absorb x-rays that are not reflected by the Wolter optic 10. While FIG. 1 shows a single Wolter optic 10, nesting of many mirrors can increase flux collection.

Figure 2:
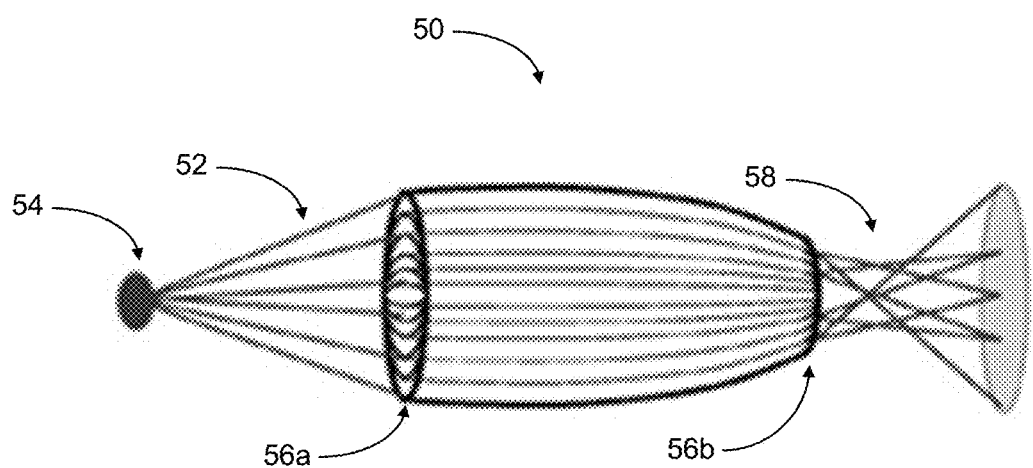
FIG. 2 schematically illustrates an example polycapillary x-ray optic.

FIG. 2 schematically illustrates an example polycapillary x-ray optic 50, which is considered to be a non-imaging optic. Each capillary of the polycapillary x-ray optic 50 serves as a light-guide, with the x-rays 52 from an x-ray source 54 received by a first end 56a of the polycapillary x-ray optic 50 being reflected many times on the inside surface of the hollow capillaries. The points on the capillary surfaces where an incident x-ray is reflected are not deterministic. As seen in FIG. 2, x-rays 58 emerging from the second end 56b of the polycapillary x-ray optic 50 diverge, with an angular extent that is determined by the critical angle of the capillary surfaces (e.g., in a x-ray spot having a micron-scale width). Since the critical angle is proportional to the wavelength, soft x-rays spread rapidly beyond the second end 56b of the polycapillary x-ray optic 50, while hard x-rays generally retain their directionality. However, the critical angle also determines the acceptance at the first end 56a of the polycapillary x-ray optic, 50 with the acceptance much higher for soft x-rays than for hard x-rays.

While it is desirable to collect and direct a larger fraction of the x-rays from an x-ray source to speed the analysis (e.g., using an optical system that captures a large fraction of the x-rays emerging from the x-ray source and to direct the captured x-rays onto the small sample), conventional axially symmetric x-ray mirror optic designs (e.g., for 1D and 2D focusing, collimating, and/or imaging applications) have limited numerical apertures (NA) and are therefore limited in the amount of radiation that can be collected (e.g., from a primary source). This limitation of the NA constrains the collection efficiency of the x-ray optic of x-rays from a primary x-ray source.

For example, an axially symmetric single-reflection x-ray optic (e.g., ellipsoidal x-ray optic) has an NA that is generally limited to about the critical angle. Axially symmetric Wolter optics which provide two reflections for collimating optics (see, e.g., FIG. 1) and four reflections for a focusing double Wolter optic can be configured to improve the radiation collection greatly (e.g., four times the critical angle for a focusing Wolter optic, in which two mirrored Wolter optics are used). In certain implementations described herein, the NA is increased further by increasing the number of reflections from the x-ray optic.

In addition, a beam stop (e.g., aperture stop 34) can be used to intercept (e.g., block) unreflected x-rays emitted from the object from propagating to the location of the image through the central region of the hollow cylindrical x-ray optic, as schematically illustrated by FIG. 1. These unreflected x-rays propagating through the central region can be a substantial fraction of the emitted x-rays and these x-rays are lost (e.g., not used in the focusing, collimating, and/or imaging by the x-ray optic), even for x-ray optics having a large diameter. However, designs which include nested x-ray optics (e.g., multiple x-ray optic components arranged concentrically about a common optical axis), can be used to reduce the "wasted" central area of a large diameter optic. While axially symmetric nested x-ray optics can be very difficult to make using conventional technology (e.g., glass capillary shaping through mandrels or by glass blowing), certain implementations described herein can utilize KB-type arrangements of sets of one-dimensional x-ray optic elements (e.g., sets of x-ray mirrors that are substantially curved in one plane along the optical axis and substantially flat in another plane substantially perpendicular to the optical axis).

The limited NA (e.g., limited optical aperture) can be problematic in applications in which these conventional x-ray mirror optics are used. For example, the x-ray mirror optic can limit the x-rays collected from a laboratory x-ray source (e.g., which can have a brightness that is orders of magnitude lower than that of a synchrotron x-ray source) and directed to illuminate a sample. For another example, the x-ray mirror optic can limit the x-rays collected for analysis (e.g., by an energy dispersive detector, wavelength spectrometer, and/or confocal XRF analyzer) from a sample irradiated by ionizing radiation (e.g., x-rays; electrons; protons), the x-rays generated in response to (e.g., induced by) the ionizing radiation. For still another example, the x-ray mirror optic can limit the spatial resolution and/or the x-ray collection efficiency when used as either a condenser or an objective lens in a full-field x-ray imaging microscope.

The focal length of conventional x-ray mirror optics can also be limited. For example, the focal length can be constrained to be longer than either the length of the x-ray mirror optic (e.g., for a single x-ray mirror optic) or the length of the downstream x-ray mirror optic (e.g., for two or more x-ray mirror optics, such as Wolter type I x-ray mirror optics, twin paraboloidal mirror lenses, and/or KB mirror pairs). The long focal length can lead directly to long distances between the sample and the detector (e.g., camera) (e.g., when used as an objective in a full-field x-ray transmission microscope or as an focusing optic in a confocal x-ray fluorescence system). These long distances, resulting from the long focal lengths, can become problematic for practical reasons when fabricating x-ray analysis systems (e.g., less stable performance in response to thermal fluctuations and/or utilizing excessive laboratory space).

Example Implementations

Certain implementations described herein provide an x-ray mirror optic having a plurality of surface segments with quadric (e.g., hyperbolic or hyperboloidal) cross-sections having differing quadric (e.g., hyperbolic or hyperboloidal) parameters. The quadric (e.g., hyperbolic or hyperboloidal) cross-sections of the surface segments share a common axis, and are configured to reflect x-rays in a plurality of reflections along a single direction or in a scattering plane (e.g., defined as containing the incident x-ray on the surface and the reflected x-ray from the surface). Certain such implementations advantageously provide larger numerical apertures, larger optical apertures, and/or shorter focal lengths than do conventional x-ray mirror optics. Certain implementations can be used in place of conventional x-ray optics (e.g., condensers; KB mirror pairs) and/or can be used in place of a zone plate x-ray optic. While various implementations are described herein as comprising reflective surface portions that are curved in two dimensions (e.g., paraboloidal; ellipsoidal; hyperboloidal) (e.g., having a first curved cross-section in a first plane and having a second curved cross-section in a second plane perpendicular to the first plane), other implementations can comprise reflective surface portions that are curved in only one direction (e.g., parabolic; elliptic; hyperbolic) (e.g., having a first curved cross-section in a first plane and having a second substantially flat cross-section in a second plane perpendicular to the first plane).

Certain implementations described herein provide axially symmetric "Super Wolter" x-ray optics comprising three or more x-ray mirror sections having quadric surface profiles (e.g., parabolic; elliptic; hyperbolic; paraboloidal; ellipsoidal; hyperboloidal). In certain implementations, these three or more x-ray mirror sections are produced from replicas of one or more mandrels. For example, the surfaces of multiple mandrels can be individually shaped to have the quadric surface profiles of the axially symmetric mirror sections and aligned with one another. In certain implementations, mandrels can be used to fabricate the sets of x-ray mirror sections (e.g., x-ray mirror sections substantially curved in one dimension or two dimensions) in multiple parts (e.g., two halves; two or more parts) and the sets of x-ray mirror sections can be assembled together to cover a predetermined range of angles around the optical axis (e.g., at least 60 degrees; at least 90 degrees; at least 180 degrees; at least 270 degrees; up to 360 degrees; less than 360 degrees).

For another example, different portions of an inner surface of a continuous glass tube can be directly shaped to form the quadric surface profiles of the axially symmetric mirror sections. In certain implementations, portions of the shaped axially symmetric capillaries are cut and aligned (e.g., by a holder or by adhering the portions together) to form the x-ray optic. In certain implementations, the inner surfaces of the glass capillary portions can comprise at least one layer (e.g., at least one coating; a plurality of layers; multilayers) comprising at least one high atomic number element (e.g., platinum; iridium), the at least one layer configured to improve the x-ray reflectivity of the inner surfaces of the glass capillary portions (e.g., in a predetermined range of x-ray energies).

Figure 3B:
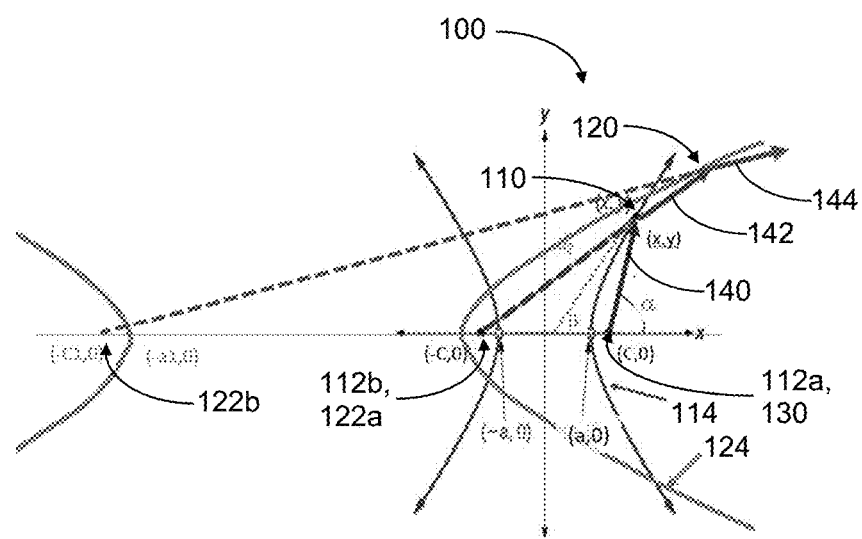
FIG. 3B schematically illustrates an example x-ray optic having hyperbolic/hyperboloidal surface portions in the x-y plane in accordance with certain implementations described herein.

FIG. 3A includes various equations relevant to a hyperbolic surface portion (e.g., in 2D) and a hyperboloidal surface portion (e.g., in 3D) in accordance with certain implementations described herein. FIG. 3B schematically illustrates an example x-ray optic 100 having hyperbolic/hyperboloidal surface portions 110, 120 in the x-y plane in accordance with certain implementations described herein. In certain implementations, a first hyperbolic/hyperboloidal surface portion 110 has one of its foci 112a aligned with a small target region 130 of an x-ray source which generates x-rays, the first hyperbolic/hyperboloidal surface portion 110 configured to create a reflected x-ray beam that appears to originate from, and to be diverging from, the conjugate focus 112b of the first hyperbolic/hyperboloidal surface portion 110. While the discussion herein is valid for both hyperbolic mirrors in 2D and hyperboloidal mirrors in 3D, only hyperboloidal mirror optics are referred to explicitly for simplicity sake.

A hyperboloid is defined by the lengths a and c, as shown in FIG. 3B, and the slope of the asymptote b/a, where $b^2=c^2-a^2$. As shown in FIG. 3B, an x-ray source 130 is positioned at a first focus (C, 0) (e.g., a primary focus 112a) of a first hyperboloidal surface portion 110 of a first hyperboloidal x-ray mirror 114, the first hyperboloidal surface portion 110 having a first hyperboloidal shape that is symmetric about the y-axis. At least some of the x-rays 140 emitted from the x-ray source (e.g., at an angle α relative to the x-axis) are reflected by the first hyperboloidal surface portion 110 (e.g., at a position (x, y)), and the reflected x-rays 142 appear to originate from a second focus (−C, 0) (e.g., the conjugate focus 112b) of the first hyperboloidal surface portion 110. As the reflection point (x, y) moves closer to the vertex (a, 0) of the first hyperboloidal surface portion 110, the grazing angle $\theta_{grazing}$ (e.g., the angle between the emitted x-ray 140 and the tangent of the first hyperboloidal surface portion 110 at the reflection point (x, y)) increases. At the position at which the grazing angle $\theta_{grazing}$ reaches the critical angle $\theta_{critical}$, the first hyperboloidal surface portion 110 no longer reflects the x-rays 140 from the x-ray source 130. With the angle α between the emitted x-ray 140 and a first axis of the first hyperboloidal surface portion 110 (e.g., the x-axis), the angle between the reflected x-ray 142 and the first axis (e.g., the x-axis) is equal to $(\alpha - 2 \cdot \theta_{grazing})$.

Figure 4:
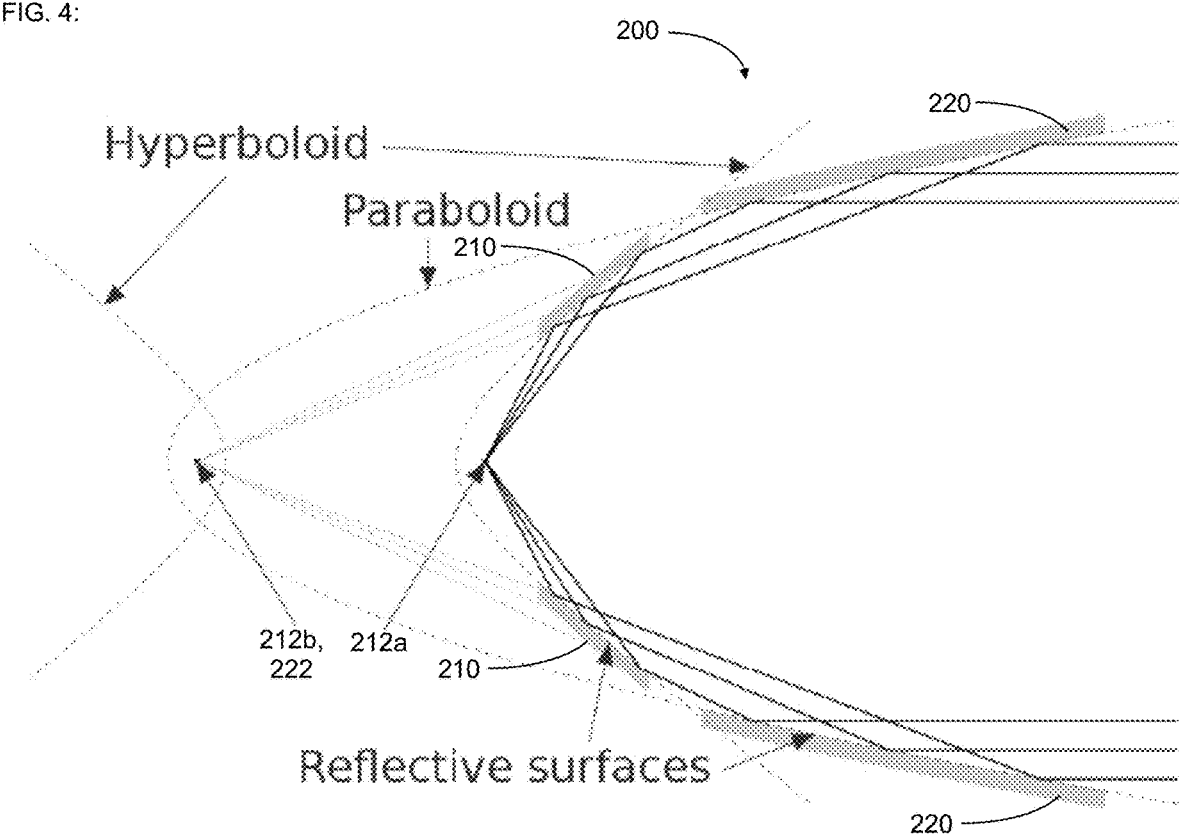
FIG. 4 schematically illustrates a cross-sectional view of an example x-ray optic comprising at least one first mirror section having a hyperboloidal surface shape and at least one second mirror section having a paraboloidal surface shape in accordance with certain implementations described herein.

FIG. 4 schematically illustrates a cross-sectional view of an example x-ray optic 200 comprising at least one first mirror section 210 having a hyperboloidal surface shape and at least one second mirror section 220 having a paraboloidal surface shape in accordance with certain implementations described herein. For example, the at least one first mirror section 210 can comprise a unitary axially symmetric mirror section and the at least one second mirror section 220 can comprise a unitary axially symmetric mirror section. In certain implementations, these unitary axially symmetric mirror sections are portions of a single monolithic reflecting element (e.g., surface of an axially symmetric substrate or tube). The focus 222 of the paraboloidal surface shape is at (e.g., substantially coincident with) the conjugate focus 212b of the hyperboloidal surface shape. In certain implementations in which the x-ray source is at the primary focus 212a of the hyperboloidal surface shape, the at least one second mirror section 220 can collimate the x-rays that are emitted by the x-ray source and that are reflected by the at least one first mirror section 210, which appear to be emitted from a virtual x-ray source positioned at the conjugate focus 212b of the hyperboloidal surface shape. In certain other implementations in which the incident x-rays are collimated and incident from the right-side of FIG. 4, the example x-ray optic 200 focuses the x-rays reflected by the at least one first mirror section 210 and the at least one second mirror section 220 to the primary focus of the hyperboloidal surface shape (e.g., acts as a telescope). In other example x-ray optics comprising a plurality of hyperboloidal surface sections from which x-rays are sequentially reflected, the focus of the paraboloidal surface shape can be at (e.g., substantially coincident with) the conjugate focus 212b of the last hyperboloidal surface shape of the plurality of hyperboloidal surface shapes. While not shown in FIG. 3B or 4, certain implementations comprise one or more beam stops configured to intercept (e.g., block) unreflected x-rays emitted from the x-ray source from propagating downstream through the central region of the axially symmetric x-ray optic.

Figure 5A:
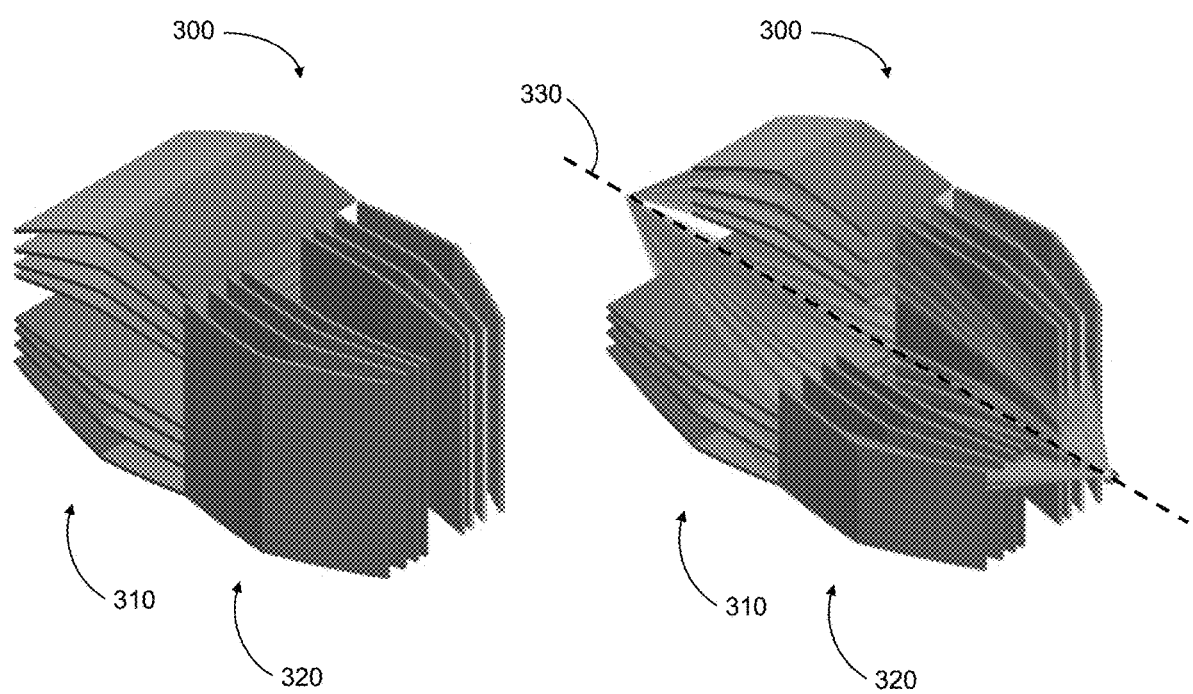
FIG. 5A schematically illustrates a perspective view and a one-half cut-away view of an example cylindrical x-ray optic in accordance with certain implementations described herein.
Figure 5B:
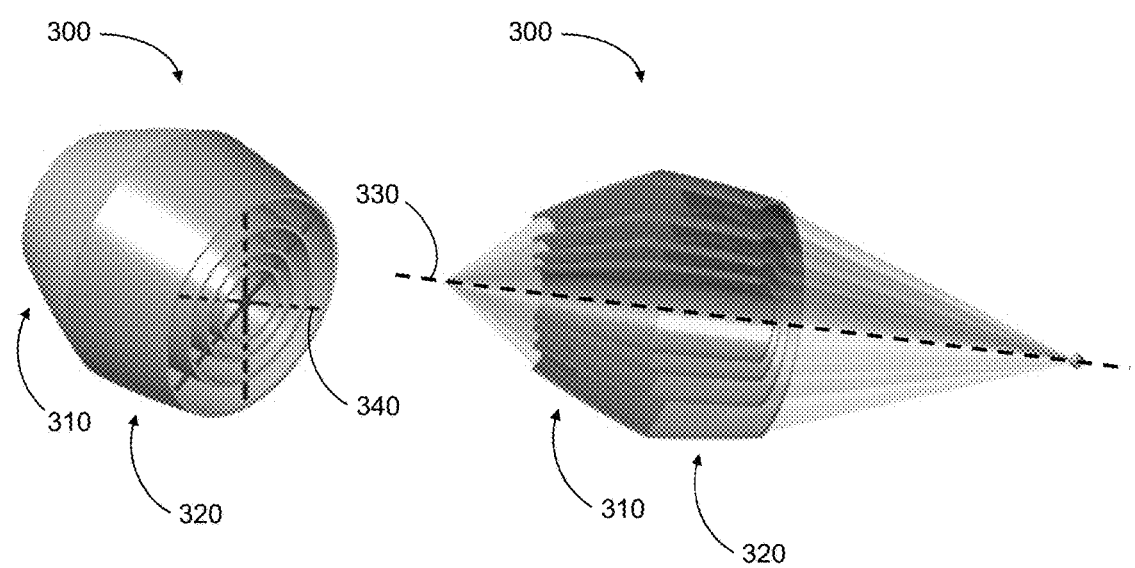
FIG. 5B schematically illustrates a perspective view and a one-quarter cut-away view of an example rotational symmetric x-ray optic in accordance with certain implementations described herein.

FIG. 5A schematically illustrates a perspective view and a one-half cut-away view of an example cylindrical Wolter x-ray optic 300 in accordance with certain implementations described herein. FIG. 5B schematically illustrates a perspective view and a one-quarter cut-away view of an example rotational symmetric Wolter x-ray optic 300 in accordance with certain implementations described herein. The example Wolter x-ray optics 300 of FIGS. 5A and 5B comprises a first plurality of non-axially symmetric mirror sections 310 (e.g., two, three, four, five or more) each having a quadric (e.g., hyperbolic) surface shape and a second plurality of non-axially symmetric mirror sections 320 (e.g., two, three, four, five or more) each having a quadric (e.g., hyperbolic) surface shape. In FIG. 5A, the mirror sections 310 are curved in only one first plane (e.g., along an optical axis 330 of the x-ray optic 300) and the mirror sections 320 are curved in only one second plane (e.g., along the optical axis 330 of the x-ray optic 300 and substantially perpendicular to the first plane) in accordance with certain implementations described herein. In FIG. 5B, the mirror sections 310 are axially symmetric (e.g., curved around the optical axis 330 of the x-ray optic 300) and the mirror sections 320 are axially symmetric (e.g., curved around the optical axis 330 of the x-ray optic 300) in accordance with certain implementations described herein. In certain implementations, as schematically illustrated by FIG. 5A, the first plurality of mirror sections 310 and/or the second plurality of mirror sections 320 can comprise pairs of mirror sections, each pair comprising two mirror sections that have substantially the same quadric (e.g., hyperbolic) surface shape and substantially the same quadric surface parameters as one another and are on opposite sides of the optical axis 330 of the x-ray optic 300. In certain other implementations, the first plurality of mirror sections 310 and/or the second plurality of mirror sections 320 can comprise multiple mirror sections that have substantially the same quadric (e.g., hyperbolic) surface shape and substantially the same quadric surface parameters as one another and are positioned around the optical axis 330 of the x-ray optic 300. In certain other implementations, other quadric shapes (e.g., elliptic) can be used. In certain implementations, the first plurality of mirror sections 310 can provide focusing (e.g., one-dimensional) along a first direction (e.g., line), and the second plurality of mirror sections 320 can provide focusing (e.g., one-dimensional) along a second direction (e.g., line) substantially perpendicular to the first direction, resulting in two-dimensional focusing (e.g., point focusing), in a manner similar to that of Kirkpatrick-Baez (KB) x-ray optics.

The first plurality of mirror sections 310 can be nested (e.g., spaced apart from and extending generally along one another; arranged concentrically about a common optical axis; substantially parallel with one another) and/or the second plurality of mirror sections 320 can be nested (e.g., spaced apart from and extending generally along one another; arranged concentrically about a common optical axis; substantially parallel with one another) and can be oriented substantially perpendicularly to the first plurality of mirror sections (e.g., similar to a KB mirror configuration). In certain implementations, adjacent mirror sections of the first plurality of mirror sections (e.g., two mirror sections without another mirror section therebetween) are spaced from one another by a distance in a range 1 micron to 10 microns. In certain implementations, adjacent mirror sections of the second plurality (e.g., two mirror sections without another mirror section therebetween) are spaced from one another by a distance in a range of 1 micron to 10 microns. In certain other implementations, the first plurality of mirror sections 310 and the second plurality of mirror sections 320 are interweaved with one another (e.g., the mirrors sections 310, 320 of the first plurality and the second plurality alternate with one another along an optical axis 330 of the x-ray optic 300. In certain implementations (see, e.g., FIG. 5B), the x-ray optic 300 comprises a plurality of nested mirror portions 310, 320 and a support structure 340 (e.g., spacers; struts; braces) configured to support and align the mirror portions 310, 320 relative to one another.

In certain implementations, the mirror sections 310, 320 of the first plurality and/or the second plurality can be etched into a substrate (e.g., silicon) (e.g., using metal assisted etching or LIGA). FIG. 6A schematically illustrates first and second substrates 410, 420 in accordance with certain implementations described herein. The first substrate 410 comprises a first plurality of reflective surfaces 412 (e.g., etched into the first substrate 410) that are curved in a first cross-sectional plane 414 (schematically illustrated by a dotted line) and that are substantially not curved (e.g., straight) along a direction substantially perpendicular to the first cross-sectional plane 414. The second substrate 420 comprises a second plurality of reflective surfaces 422 (e.g., etched into the second substrate 420) that are curved in a second cross-sectional plane 424 (schematically illustrated by a dotted line) and that are substantially not curved (e.g., straight) along a direction substantially perpendicular to the second cross-sectional plane 424. The second substrate 420 is positioned relative to the first substrate 410 such that the second cross-sectional plane 424 is substantially perpendicular to the first cross-sectional plane 414. In certain implementations, the first plurality of reflective surfaces 412 and the second plurality of reflective surfaces 422 are configured to focus incident x-rays to a focal point (e.g., in a KB mirror configuration). In certain other implementations, the first plurality of reflective surfaces 412 and the second plurality of reflective surfaces 422 are configured to collimate incident x-rays (e.g., collimate in two dimensions). In certain implementations, the first plurality of reflective surfaces 412 and the second plurality of reflective surfaces 422 are separated from one another by a distance in a range of less than one micron, a range of 1 micron to 5 microns, a range of 5 microns to 20 microns, or a range of 20 microns to 100 microns. In certain implementations, the reflective surfaces 412, 422 are KB-mirror-like to focus in a point-like manner, while in certain other implementations, the reflective surfaces 412, 422 both have a collimating shape to collimate in two dimensions.

FIG. 6B schematically illustrates a pair of first substrates 410 and a pair of second substrates 420 in accordance with certain implementations described herein. One substrate of the pair of first substrates 410 comprises a first plurality of reflective surfaces 412a (e.g., etched into the substrate) that are curved in a first cross-sectional plane 414a and that are substantially not curved (e.g., straight) along a direction substantially perpendicular to the first cross-sectional plane 414a and the other substrate of the pair of first substrates 410 comprises a second plurality of reflective surfaces 412b (e.g., etched into the substrate) that are curved in a second cross-sectional plane 414b and that are substantially not curved (e.g., straight) along a direction substantially perpendicular to the second cross-sectional plane 414b. One substrate of the pair of second substrates 420 comprises a third plurality of reflective surfaces (not shown)(e.g., etched into the substrate) that are curved in a third cross-sectional plane 424a and that are substantially not curved (e.g., straight) along a direction substantially perpendicular to the third cross-sectional plane 424a and the other substrate of the pair of second substrates 420 comprises a fourth plurality of reflective surfaces (not shown)(e.g., etched into the substrate) that are curved in a fourth cross-sectional plane 424b and that are substantially not curved (e.g., straight) along a direction substantially perpendicular to the fourth cross-sectional plane 424b. The pair of first substrates 410 can be positioned such that the second cross-sectional plane 414b is substantially parallel to the first cross-sectional plane 414a, and the pair of second substrates 420 can be positioned such that the fourth cross-sectional plane 424b is substantially parallel to the third cross-sectional plane 424a, and the third cross-sectional plane 424a is substantially perpendicular to the first cross-sectional plane 414a. For example, as schematically illustrated by FIG. 6B, the pair of first substrates 410 can form a Wolter x-ray optic and the pair of second substrates 420 can form a Wolter x-ray optic in an orthogonal direction to that of the pair of first substrates 410. In both FIGS. 6A and 6B, the separation between adjacent and substantially parallel reflective surfaces of a plurality of reflective surfaces can be on the order of microns (e.g., in a range of 1 micron to 10 microns), and the surface roughness can be less than 2 nanometers (e.g., by using thermal annealing or another process to reduce surface roughness of the etched surfaces).

In certain implementations, the example x-ray optic can be used in place of a zone plate x-ray optic downstream from a sample under analysis. The example x-ray optic can provide achromatic focusing, so that multiple zone plates for different x-ray wavelengths are not needed. For example, in x-ray systems utilizing multiple x-ray wavelengths, instead of using multiple zone plates, each designed for one x-ray energy, a single x-ray optic in accordance with certain implementations described herein can be used if the x-ray wavelengths are sufficiently close together such that the critical angles for reflection are not substantially different from one another.

For other x-ray systems in which the x-ray wavelengths are not sufficiently close together (e.g., TriLambda x-ray system marketed by Sigray, Inc. of Concord Calif.), multiple x-ray optics in accordance with certain implementations described herein can be used. In certain implementations, the x-ray optic can be used as a zone plate replacement for hard x-ray energy imaging (e.g., 17 keV with molybdenum x-rays or 11 keV with Au x-rays).

In addition, zone plates exhibit substantial chromatic aberration, so that laboratory x-ray systems are limited to x-ray sources that produce a characteristic x-ray line that can be separated from other characteristic x-ray lines (e.g., the $K_\alpha$ x-ray line can be filtered from the $K_\beta$ x-ray line). By using the achromatic performance of the x-ray optic of certain implementations instead of using zone plates, other laboratory x-ray sources (e.g., molybdenum; silver; rhodium K-line) can be used.

Example Implementation #1

In certain implementations, one or more x-ray mirrors having a plurality of hyperbolic/hyperboloidal surface portions can be used to collect x-rays from an x-ray source with a large emission angle. For example, referring to FIG. 3B, the one or more x-ray mirrors comprises a first hyperboloidal surface portion 110, as described above, and a second hyperboloidal surface portion 120 that has a second axis common (e.g., shared; substantially coaxial) with the first axis (e.g., the x-axis) but having a smaller value of the asymptote slope b/a, and with a first focus (e.g., a primary focus 122a) substantially coincident with the conjugate focus 112b at (−c, 0) of the first hyperboloidal surface portion 110. The first hyperboloidal surface portion 110 is configured to intercept (e.g., reflect) x-rays 140 emitted from the x-ray source 130 at the primary focus 112a at (c, 0) of the first hyperboloidal surface portion 110. These singly-reflected x-rays 142 appear to originate from the conjugate focus 112b at (−c, 0) of the first hyperboloidal surface portion 110 (e.g., a virtual x-ray source). The second hyperboloidal surface portion 120 is configured to intercept (e.g., reflect) x-rays 142 reflected by the first hyperboloidal surface portion 110, resulting in an additional reduction of the angle between the twice-reflected x-rays 144 with the shared hyperboloidal mirror axis (e.g., the x-axis). The twice-reflected x-rays 144 appear to originate from a second focus 122b at (−Cl, 0) (e.g., the conjugate focus 122b) of the second hyperboloidal surface portion 120.

In certain implementations, additional hyperboloidal surface portions can be used (e.g., 3, 4, 5, or more hyperboloidal surface portions), with each hyperboloidal surface portion serving as a virtual x-ray source for the subsequent hyperboloidal surface portion. The sequential hyperboloidal surface portions have successively smaller asymptote slope values b/a, to multiply reflect and to obtain larger reductions of the angle between the initial x-ray emitted from the x-ray source with the hyperboloidal mirror axis common to (e.g., shared by; substantially coaxial with) all the hyperboloidal mirror portions (e.g., the x-axis). For example, the angle between the last reflected x-ray and the shared hyperboloidal mirror axis can be reduced to be close to zero. In certain implementations, an x-ray optic comprises a plurality of hyperboloidal mirror surface portions that are configured to collect x-rays from an x-ray source with large angles with respect to the shared hyperboloidal axis (e.g., up to $2 \cdot N \cdot \theta_{critical}$, where N is the number of successive hyperboloidal surface portions. In certain implementations, the x-rays emitted from the x-ray source at (C, 0) that impinge and are not reflected by the first hyperboloidal surface are intercepted by a central beam stop and/or the nested set of additional hyperboloidal surfaces.

Example Implementation #2

In certain implementations, according to the reciprocal principle, incident x-rays are reflected by and focused by the hyperbolic/hyperboloidal surface portions disclosed in the example implementation #1 to converge at the point (C, 0). Certain such implementations utilize a carefully tailored converging beam of x-rays to match the reversed output from example implementations #1.

Example Implementation #3

In certain implementations, one or more x-ray mirrors having a plurality of nested hyperbolic/hyperboloidal surface portions can be used to collect x-rays in a large collection angle from the x-ray source. For example, to collect x-rays from an x-ray source over a large angular range, a nested array of hyperboloidal mirrors having a common (e.g., shared; substantially coincident) primary focus and a common (e.g., shared; substantially coaxial) hyperboloidal axis, each hyperboloidal mirror of the nested array having a different value of the hyperbolic parameter b (or a different value of the ratio b/a, since the nested set shares the same value of c, so if b changes, b/a also changes). In certain implementations, the thickness of the hyperboloidal mirror is less than the gap distance between two neighboring hyperboloidal mirrors.

Example Implementation #4

In certain implementations, one or more x-ray mirrors having a plurality of nested hyperbolic/hyperboloidal surface portions can be used in combination with a nested set of parabolic/paraboloidal mirror surfaces to produce a collimated x-ray beam. For example, the nested set of parabolic/paraboloidal mirror surfaces can be substantially coaxial with the common (e.g., shared) hyperbolic/hyperboloidal axis and the foci of the parabolic/paraboloidal mirror surfaces can be at the conjugate foci of the last hyperbolic/hyperboloidal mirror surfaces of the nested hyperbolic/hyperboloidal mirror surfaces (e.g., provided that the angle of the x-rays reflected by the last hyperbolic/hyperboloidal mirror surface and the shared axis is less than the critical angle of the parabolic/paraboloidal mirror surface).

Example Implementation #5

In certain implementations, one or more x-ray mirrors having a plurality of hyperbolic/hyperboloidal surface portions can be used in combination with an optic train following the plurality of hyperbolic/hyperboloidal surface portions, to produce a focused x-ray beam. The optic train can comprise at least one of the following:

An elliptical/ellipsoidal mirror surface (elliptical if following a hyperbolic mirror surface, ellipsoidal if following a hyperboloidal mirror surface), when the x-ray beam divergence angle is less than the critical angle of the reflection surface of the elliptical/ellipsoidal mirror surface;

A first parabolic/paraboloidal mirror surface (parabolic if following a hyperbolic mirror surface, paraboloidal if following a hyperboloidal mirror surface) configured to collect and collimate the x-rays followed by a second parabolic/paraboloidal mirror surface configured to focus the collimated beam;

An elliptical/ellipsoidal mirror surface (elliptical if following a hyperbolic mirror surface, ellipsoidal if following a hyperboloidal mirror surface) followed by a second set of hyperbolic/hyperboloidal surface portions having a reversed orientation relative to the first set of hyperbolic/hyperboloidal surface portions; and A cylindrical mirror, when the x-ray beam divergence angle, after the plurality of hyperbolic/hyperboloidal surface portions, is smaller than the critical angle of the cylindrical mirror. Certain such implementations provide a symmetric focusing system with 1:1 magnification when the second set of hyperbolic/hyperboloidal surface portions is the same as the first set of hyperbolic/hyperboloidal surface portions.

Example Implementation #6

In certain implementations, the x-ray optic is a compound optic and comprises a first plurality of orthogonal 1D focusing optics comprising hyperbolic surface portions and corresponding elliptical surface portions following the hyperbolic surface portions and a second plurality of orthogonal 1D focusing optics comprising hyperbolic surface portions and corresponding elliptical surface portions following the hyperbolic surface portions, configured to provide point focusing. In certain implementations, the first plurality can be nested with one another and/or the second plurality can be nested with one another. The x-ray optic can be a compound optic configured to collect x-rays from a point source over a large acceptance angle.

Example Implementation #7

In certain implementations, the x-ray optic is a compound optic and comprises a first plurality of orthogonal 1D focusing optics comprising hyperbolic surface portions and corresponding parabolic surface portions following the hyperbolic surface portions (e.g., configured to provide 1D collimation) and a second plurality of orthogonal 1D focusing optics comprising hyperbolic surface portions and corresponding parabolic surface portions following the hyperbolic surface portions (e.g., configured to provide 1D collimation), all configured to provide 2D collimation. In certain implementations, the first plurality can be nested with one another and/or the second plurality can be nested with one another. The x-ray optic can be a compound optic configured to focus a collimated x-ray beam to a point focus.

Example Implementation #8

In certain implementations, the x-ray optic of example implementation #6 can be followed by another x-ray optic of example implementation #6 in reverse order, so as to collect x-rays from an x-ray source and to focus the x-rays to a point focus.

Example Implementation #9

In certain implementations, the x-ray optic of example implementation #7 can be followed by another x-ray optic of example implementation #7 in reverse order, so as to collect collimated x-rays and to focus the x-rays to a point focus.

Although commonly used terms are used to describe the systems and methods of certain implementations for ease of understanding, these terms are used herein to have their broadest reasonable interpretations. Although various aspects of the disclosure are described with regard to illustrative examples and implementations, the disclosed examples and implementations should not be construed as limiting. Conditional language, such as "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements, and/or steps are in any way required for one or more implementations. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Conjunctive language such as the phrase "at least one of X, Y, and Z," unless specifically stated otherwise, is to be understood within the context used in general to convey that an item, term, etc. may be either X, Y, or Z. Thus, such conjunctive language is not generally intended to imply that certain implementations require the presence of at least one of X, at least one of Y, and at least one of Z.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree. The ranges disclosed herein also encompass any and all overlap, sub-ranges, and combinations thereof. Language such as "up to," "at least," "greater than," less than," "between," and the like includes the number recited. As used herein, the meaning of "a," "an," and "said" includes plural reference unless the context clearly dictates otherwise. While the structures and/or methods are discussed herein in terms of elements labeled by ordinal adjectives (e.g., first, second, etc.), the ordinal adjectives are used merely as labels to distinguish one element from another, and the ordinal adjectives are not used to denote an order of these elements or of their use.

Various configurations have been described above. It is to be appreciated that the implementations disclosed herein are not mutually exclusive and may be combined with one another in various arrangements. Although this invention has been described with reference to these specific configurations, the descriptions are intended to be illustrative of the invention and are not intended to be limiting. Various modifications and applications may occur to those skilled in the art without departing from the true spirit and scope of the invention. Thus, for example, in any method or process disclosed herein, the acts or operations making up the method/process may be performed in any suitable sequence and are not necessarily limited to any particular disclosed sequence. Features or elements from various implementations and examples discussed above may be combined with one another to produce alternative configurations compatible with implementations disclosed herein. Various aspects and advantages of the implementations have been described where appropriate. It is to be understood that not necessarily all such aspects or advantages may be achieved in accordance with any particular implementation. Thus, for example, it should be recognized that the various implementations may be carried out in a manner that achieves or optimizes one advantage or group of advantages as taught herein without necessarily achieving other aspects or advantages as may be taught or suggested herein.

What is claimed is:

1. An x-ray mirror optic comprising:
   a plurality of surface segments with quadric cross-sections having differing quadric parameters, the quadric cross-sections of the plurality of surface segments sharing a common axis, and configured to reflect x-rays in a plurality of reflections along a single optical axis or in a scattering plane defined as containing an incident x-ray and a corresponding reflected x-ray, the plurality of surface segments comprising:
      a first surface segment having a first hyperbolic or hyperboloidal cross-sectional shape and a first asymptotic slope, the first surface segment having a first focus and a second focus, the first focus configured to be substantially coincident with an x-ray source; and a second surface segment having a second hyperbolic or hyperboloidal cross-sectional shape and a second asymptotic slope smaller than the first asymptotic slope, the second surface segment having a third focus and a fourth focus, the third focus substantially coincident with the second focus of the first surface segment.

2. The x-ray mirror optic of claim 1, wherein the differing quadric parameters comprise hyperbolic or hyperboloidal parameters.

3. The x-ray mirror optic of claim 1, wherein the plurality of surface segments are curved in one dimension.

4. The x-ray mirror optic of claim 1, wherein the plurality of surface segments are curved in two dimensions.

5. The x-ray mirror optic of claim 1, wherein the first hyperbolic or hyperboloidal cross-sectional shape is axially symmetric to a first axis, and the second hyperbolic or hyperboloidal cross-sectional shape is axially symmetric to the first axis.

6. The x-ray mirror optic of claim 5, wherein the first surface segment is configured to reflect x-rays emitted from the x-ray source, and the second surface segment is configured to reflect x-rays reflected by the first surface segment.

7. The x-ray mirror optic of claim 5, wherein the plurality of surface segments further comprises a third surface segment having a third hyperbolic or hyperboloidal cross-sectional shape that is axially symmetric to the first axis and has a third asymptotic slope smaller than the second asymptotic slope, the third surface segment having a fifth focus and a sixth focus, the fifth focus substantially coincident with the fourth focus of the second surface segment.

8. The x-ray mirror optic of claim 7, wherein the third surface segment is configured to reflect x-rays reflected by the second surface segment.

9. The x-ray mirror optic of claim 5, wherein the plurality of surface segments further comprises a paraboloidal surface segment having a paraboloidal shape, a focus of the paraboloidal shape substantially coincident with the fourth focus of the second surface segment.

10. The x-ray mirror optic of claim 9, wherein the paraboloidal surface segment is configured to collimate the x-rays emitted by the x-ray source, reflected by the first surface segment, and then reflected by the second surface segment.

11. An x-ray mirror optic comprising:
a first plurality of non-axially symmetric mirror sections; and
a second plurality of non-axially symmetric mirror sections,
wherein the first plurality of non-axially symmetric mirror sections and/or the second plurality of non-axially symmetric mirror sections comprises:
a first mirror segment having a first hyperbolic or hyperboloidal shape having a first asymptotic slope, the first mirror segment having a first focus and a second focus, the first focus configured to be substantially coincident with an x-ray source; and
a second mirror segment having a second hyperbolic or hyperboloidal shape having a second asymptotic slope smaller than the first asymptotic slope, the second mirror segment having a third focus and a fourth focus, the third focus substantially coincident with the second focus of the first mirror segment.

12. The x-ray mirror optic of claim 11, wherein the first plurality of non-axially symmetric mirror sections and/or the second plurality of non-axially symmetric mirror sections comprises pairs of mirror sections, each pair of the pairs of mirror sections comprising two mirror sections that have substantially a same quadric surface shape and quadric surface parameters as one another, and are on opposite sides of an optical axis of the x-ray mirror optic.

13. The x-ray mirror optic of claim 11, wherein the first plurality of non-axially symmetric mirror sections is configured to provide focusing along a first direction, and the second plurality of non-axially symmetric mirror sections is configured to provide focusing along a second direction substantially perpendicular to the first direction.

14. The x-ray mirror optic of claim 11, wherein the first plurality of non-axially symmetric mirror sections are nested with one another and/or the second plurality of non-axially symmetric mirror sections are nested with one another.

15. The x-ray mirror optic of claim 11, wherein the first plurality of non-axially symmetric mirror sections are substantially parallel with one another and/or the second plurality of mirror sections are substantially parallel with one another.

16. The x-ray mirror optic of claim 15, wherein the second plurality of non-axially symmetric mirror sections are oriented substantially perpendicularly to the first plurality of non-axially symmetric mirror sections.

17. The x-ray mirror optic of claim 11, wherein the first plurality of non-axially symmetric mirror sections and the second plurality of non-axially symmetric mirror sections are interweaved with one another.

18. A method of fabricating an x-ray mirror optic, the method comprising:
etching a first plurality of non-axially symmetric mirror sections and/or a second plurality of non-axially symmetric mirror sections into a substrate, wherein the first plurality of non-axially symmetric mirror sections and/or the second plurality of non-axially symmetric mirror sections comprises:
a first mirror segment having a first hyperbolic or hyperboloidal shape having a first asymptotic slope, the first mirror segment having a first focus and a second focus, the first focus configured to be substantially coincident with an x-ray source; and
a second mirror segment having a second hyperbolic or hyperboloidal shape having a second asymptotic slope smaller than the first asymptotic slope, the second mirror segment having a third focus and a fourth focus, the third focus substantially coincident with the second focus of the first mirror segment.

* * * * *